United States Patent [19]

Pierrat et al.

[11] 4,052,928
[45] Oct. 11, 1977

[54] CAM-TYPE GEARING AND THE LIKE
[75] Inventors: Michel A. Pierrat; Carl J. Holt, Jr., both of Andover, Mass.
[73] Assignee: COMPUDRIVE Corporation, North Billerica, Mass.
[21] Appl. No.: 658,887
[22] Filed: Feb. 18, 1976
[51] Int. Cl.² .......................... B23F 5/02; B23F 5/20
[52] U.S. Cl. .......................................... 90/3; 51/287; 51/95 GH; 51/97 NC
[58] Field of Search ............... 90/3, 1, 6, 20; 51/287, 51/91 R, 97 NC, 105 EC, 95 GH

[56] References Cited
U.S. PATENT DOCUMENTS
1,798,059  3/1931  Bilgram et al. ........................... 90/3

FOREIGN PATENT DOCUMENTS
792,462  3/1958  United Kingdom ...................... 90/3

Primary Examiner—Othell M. Simpson
Assistant Examiner—Z. R. Bilinsky
Attorney, Agent, or Firm—Cesari & McKenna

[57] ABSTRACT

Continuous-curvature lobed cams, such as are variously used after the manner of gearing in orbital-drive mechanical transmissions, hydraulic motors and the like, are formed with the precise and continuous distinctive contouring which is essential to their successful operation by way of a simple and inexpensive cutting tool rotated about a fixed axis in a conventional machine while the cam blank with which it is in a material-removing engagement is both rotated relatively slowly in one angular direction and orbited relatively rapidly and synchronously along a circular path in the opposite angular direction. Synchronism between the slow rotary and rapid orbital motions is achieved in a machine-mounted fixture through geared drive of two rotary tables from a common motive source on the same movable platen which mounts the two rotary tables. One of the rotary tables orbits the platen along an adjustable-eccentricity path relative to the supporting machine bed, as accommodated by an X-Y mount, and the number of cam lobes to be fashioned is determined by introducing an appropriate gear in an adjustable gear train between the motive source and the other rotary table which rotates the cam blank.

8 Claims, 8 Drawing Figures

CAM-TYPE GEARING AND THE LIKE

BACKGROUND OF THE INVENTION

The cams with which the present invention is principally concerned have long been well known in configuration, per se, and have become identified generically by the term "gerotor". They are characterized by internal or external contours which, unlike the teeth of conventional gears, are lobed and exhibit continuous curvature rather than discontinuous or irregular shapings. When such contouring is exactly in accordance with theory, mated inner and outer cams, or one such cam cooperating with a circular array of rollers in place of the other, lend themselves to highly-efficient cooperations wherein all lobes and/or rollers are constantly in working meshed contact while one is orbited within the other. For the latter purpose, the outer one of the two cams, or cam and array of rollers, normally has a number of lobes or rollers which exceeds by one the number of the other. Examples of constructions in which such units are advantageously used in such devices as pumps, hydraulic motors and speed changing transmissions may be found in U.S. Pat. No. 3,574,489 — Pierrat and in copending application Ser. No. 530,224, filed Dec. 6, 1974, for "Mechanical Drives" — Pierrat. Contouring of the cams is so critical, and has been so difficult to achieve with the requisite precision, that early versions were matched as sets which were worn to about the right shapings by running-in which burnished their surfaces to an acceptable operating fit. Subsequent versions, precise enough to allow for interchangeability, have since become commercially available, but are evidently difficult to produce because their cost is very high. The manufacturing technique which suggests itself is that of guiding a circular milling cutter of the like around the periphery which is to be shaped into the lobes, under the direction of a contour guide or in accordance with a computed program to which either or both of the cutter and cam blank are slaved as to relative motion. However, the sizes and lobe numbers of such cams may vary widely, and the contouring guides or programs must be of equal variety and based upon complex calculations and/or empirically-derived data. Special-purpose cutting machinery capable of performing such needed contouring tend to be expensive and to call for uncommon operating skills.

Our improved and unusual approach to realizing the critically-contoured lobed cams, with great precision and ease and economy, requires neither contour guides nor programmed computer-controlled automatic cutting machines; instead, it uniquely recognizes and takes into account a distinctive combination of synchronized reverse-direction rotary and orbital motions and develops these by way of a novel and uncomplicated fixture in which the needed special relative motions between a cutter and cam blank are automatically and accurately generated and are readily changeable to meet varied contouring specifications.

SUMMARY

A preferred arrangement for machining "gerotor" lobed cams in accordance with the present teachings comprises a rigid platen held in non-turning relation to a base by way of mutually-perpendicular slides forming an X—Y suspension which nevertheless allows the platen to move laterally. Atop the platen is secured a first rotary table capable of mounting a cam blank and rotating it about a first axis normal to the platen at a relatively slow angular rate governed by a gear train and electric drive motor which are also carried by the platen. Dependent from the underside of the same platen is a second rotary table which turns an adjustable-eccentricity crank arm in a suitable bearing fixed with the base, the axis of rotation of the second rotary table also being normal to the platen and the rotation thereof being mechanically synchronized with that of the first table by gearing with the same electric drive motor, although the latter gearing turns the second table at a relatively rapid rate and in a direction opposite to that of the first table. The vertical cutting tool of a circular milling machine, upon which the base of the aforesaid assembly is mounted, is brought into lateral material-removal relationship with the cam blank as the drive motor rotates the two tables, with the result that the desired number and contouring of lobes is occasioned in accordance with preselected settings of the eccentricity and of gear ratios determined by one gear in the train serving the first table. The arc circumscribed by the cutting edges of the cutting tool is the same as that of rollers or cooperating cam surfaces with which the cam is to be used. Synchronism between the angular rotations of the two tables, as selected by said one gear, is such that the second table turns once for each angular excursion of the first table which is equal to the intended spacing between adjacent lobes of the finished cam.

Accordingly, it is one of the objects of the present invention to provide for unique and advantageous fashioning of gerotor cams by way of combined synchronized rotation and opposite-direction circular orbiting of a cam blank while continuous-curvature lobe surfaces are shaped by a cutter having a configuration matched with that of rollers or other surfaces with which the cam is to be used and operated at a relatively fixed position.

Another object is to provide novel and improved apparatus for relatively low-cost and versatile precision machining of gerotor cams in a variety of sizes and with different numbers of continuous-curvature lobe surfaces, by way of fixturing in which a cam blank is automatically oriented for proper removal of material in a conventional type of cutting machine, the fixturing being powered and synchronized to effect simultaneous orbiting of the cam blank in one direction and rotation in the other.

BRIEF DESCRIPTION OF THE DRAWINGS

Although the aspects and features of this invention which are considered to be novel and unobvious are expressed in the appended, claims, further details as to preferred practices and as to the further objects and features thereof may be most readily comprehended through reference to the following description of preferred embodiments taken in connection with the accompanying drawings, wherein:

DESCRIPTION OF THE PREFERRED EMBODIMENTS

Figure 1:
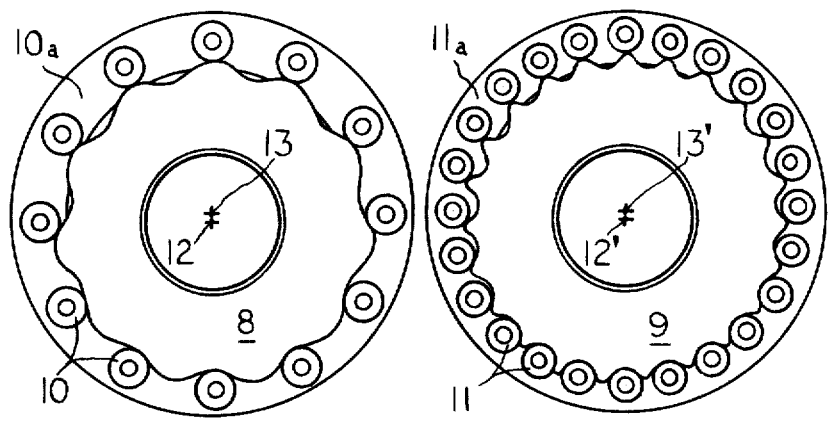
FIG. 1 presents a plan view of two companion sun-and-planet sets of rollers and lobed cams for use in a speed-reducing mechanical drive, the cam elements being of configuration with which this invention is concerned.

The paired sets of cams, 8 and 9, and cooperating rollers, 10 and 11, which appear in FIG. 1 are of configuration and arrangement suitable for exploitation in a speed-reducing mechanical drive which has been known heretofore and which requires precisely-contoured continuous-curvature lobed cams in a variety of sizes and with different numbers of lobes for different speed changes. Lobed cams 8 and 9 each function there as a "planet gear" and have their epitrochoid-curvature external lobes in cooperative "meshed" engagements with the rollers, 10 and 11, respectively, pinned to the disks 10a and 11a to form external "sun gears" within which the inner planet cams may orbit. In accordance with established practice, each of the planet cams 8 and 9 has one less convex lobe or "tooth" than there are rollers functioning after the manner of "teeth" on the sun disk encircling it, the cam 8 having eleven lobes for the surrounding twelve rollers 10 and the cam 9 having twenty-three lobes for the surrounding twenty-four rollers 11. The two planet cams 9 and 8 are intended to be integral or otherwise locked angularly together face to face, with their centers 12 and 12′ lying along a common eccentric axis of a circular eccentric shoulder of an input shaft (not shown), the cams being rotatable together about that eccentric shoulder. Centers 13 and 13′ of the sun disks 10a and 11a coincide with the central axis of the same input shaft. When one of the sun disks, such as 11a, is angularly restrained, the other will turn and provide a significantly-reduced speed of rotational output in relation to that of the input shaft. Rotation of the input shaft, and its eccentric shoulder, causes cam 9 to orbit within the circular array of rollers 11 of the fixed sun disk 11a, that orbiting yielding a reverse-direction rotation of cam 9 about its center 12′ with a speed reduction determined by its number of lobes; simultaneously, cam 8 angularly locked with cam 9 must undergo a like rotation, and, in so doing, orbits within the circular array of rollers 10 and thereby forces sun disk 10a to rotate at a yet further reduced speed as dictated by the number of lobes on cam 8. The total speed change effected by this combination is determined by the relationship $(N_1)(N_2+1)/N_1-N_2$, where $N_1$ is the number of lobes of cam 9 and $N_2$ is the number of lobes of cam 8.

If cams 8 and 9 have their lobes shaped properly, all of the cooperating rollers 10 and 11 will at all times be in mating contacts therewith and nearly half of the rollers and lobes will be operative to share the load being transmitted; noise and backlash are advantageously minimized in such an arrangement, and outstanding torque-transmitting capabilities are promoted. Cylindrical rollers, and their circular equi-angularly spaced arrays on disks, can be realized readily enough using known manufacturing techniques. However, the contouring of the cam lobes poses problems as noted hereinbefore, and which are perhaps better appreciated in relation to the operating requirements stated with reference to the arrangement of FIG. 1. Such problems are obviously posed also by alternative constructions wherein pins are substituted for the rollers, and wherein internally-lobed cams cooperate with externally-lobed cams or rollers or pins.

Figure 2:
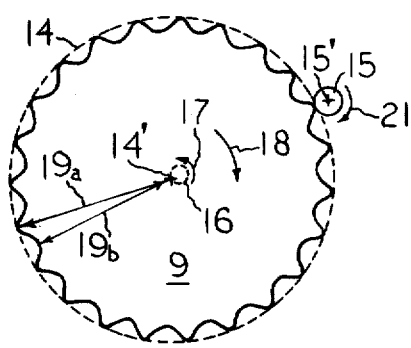
FIG. 2 is a plan view of one of the lobed cams of FIG. 1, in association with a tool used in its cutting and with designations of orbiting and rotational movements involved in its cutting.
Figure 3A:
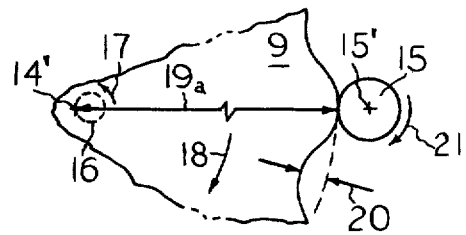
FIG. 3A represents an enlarged and partly-broken-away fragment of a cam like that of FIG. 2 at a time during machining when its eccentricity is at one extreme.
Figure 3B:
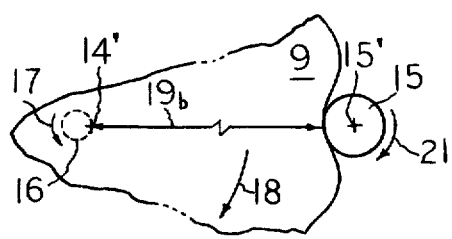
FIG. 3B is an illustration like that of FIG. 3A but for the condition when eccentricity is at the opposite extreme.

FIG. 2 illustrates our approach to the forming of a lobed cam such as the cam 9 of FIG. 1. There, dashed linework 14 represents the original circular outline of a blank from which the cam is machined, its center being designated 14′. A cutting tool 15, such as a conventional fluted milling cutter, is rotated about an axis 15′ normal to the blank in position to engage its periphery, and, simultaneously, the blank is orbited such that its center 14′ moves along a relatively small circular path or orbit, designated by dashed linework 16, in one angular direction, 17, at a relatively rapid rate, while the blank is also being turned about its center 14′ in an opposite angular direction, 18, at a slower rate. Unless the said angular directions are opposite, the resulting lobes will not have the correct gerotor curvatures and the cams will not be suitable for the applications described. In FIGS. 3A and 3B, wherein the same reference characters are used to designate the same or functionally-corresponding parts and relationships as in FIG. 2, a portion of a cam such as cam 9 is shown at extremes of its material-removal engagements with cutter 15. The maximum radial span, 19a, from the center 14′ of cam 9 to the outer tip of a convex lobe, occurs when that center is on the point of orbit 16 laterally most removed from the cutter (FIG. 3A), and the minimum radial span, 19b, from the center 14′ of cam 9 to the innermost part or bottom of a concave lobe, occurs when that center is on the diametrically-opposite point of orbit 16, laterally closest to the cutter (FIG. 3B). The common maximum depth, or height, 20 (FIG. 3A), of all the lobes corresponds to the diameter of orbit 16. Cutter 15, when of the rotary type illustrated, is preferably turned about its fixed-position axis 15′ in a direction, such as 21, which allows it to bite into advancing material of the cam blank. At the same time that the cam blank is orbited in one direction, so that it will advance toward and retreat from the cutter sinusoidally at a given periodicity, it is also turned at a uniform rate and a slower periodicity in the opposite angular direction, and the number of full oribts for each full turn is preselected to equal the full number of continuous-curvature lobes desired. The diameter of cutter 15 is preferably the same as that of the rollers with which the cam is to cooperate, such as rollers 11 in the case of cam 9. Although a milling-type cutter 15 is preferred, a single-bladed cutter or abrasive cutter may also be revolved about axis 15′ in its place, or alternatively, another form of cutter may be drawn or reciprocated at the desired site or rotated about an axis normal to axis 15′, for example, with like material-removal effects.

Figure 4:
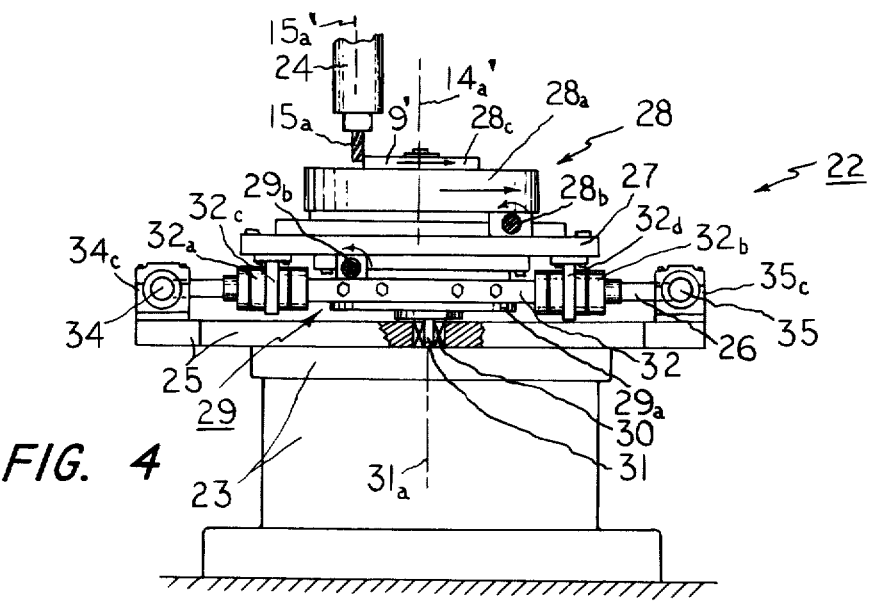
FIG. 4 provides a front view of portions of a cam-cutting fixture mounted upon the bed of a milling machine and cooperating with a cutting tool of the same machine.

The machining apparatus illustrated in FIG. 4 includes a unique fixture, 22 (FIGS. 4 and 7) which develops the movements of a cam blank needed to realize the desired gerotor-lobe curvatures and which can be accommodated readily by a generally-conventional milling machine having a mounting bed 23 and a vertical spindle 24 for rotation of a fluted cutting tool 15a about a vertical axis 15a'. Fixture 22 includes a sturdy baseplate 25, which may be secured to the machine mounting bed 23, and an intermediate rigid plate 26 suspended in vertically-spaced relation to that baseplate, and a rigid top mounting platen 27 suspended in vertically-spaced relation to the intermediate plate. Atop the mounting platen 27 there is fixed a first rotary table 28, which is of a known construction including a table 28a supported in bearings for rotation about a vertical axis 14a' and having a laterally-extending input shaft 28b which turns worm gearing to rotate table 28a about its axis 14a'. Dependent from the underside of the same mounting platen 27 is a second rotary table 29 which is like the first, but inverted, and includes a table 29a supported in bearings for rotation about a vertical axis and has a laterally-extending shaft 29b which turns worm gearing to rotate table 29a about its axis. Intermediate plate 26 is suitably cut away (not visible in the drawings) to accommodate the presence of the second rotary table 29 and to allow it to cooperate with a bearing 30 in baseplate 25 which is disposed eccentrically in relation to the axis of the table 29a. Both of the tables 28a and 29a have customary provisions for releasably clamping items to their exposed table surfaces; in the case of the first table 28a, such a clamping is effected at 28c to hold a cam blank 9' in place coaxially with axis 14a', and, in the case of the inverted second table 29a, such a clamping is effected at 29c to hold a shaft 31 in the baseplate bearing 30 in eccentric relation to the vertical axis of the lower rotary table 29a. Cam blank 9' represents the item to which lobe contouring is imparted by the cutter 15a, and the eccentricity of the axis 31a of shaft 31, which functions as a crankshaft, determines the circular orbit referred to earlier herein.

When input shaft 29b to lower rotary table 29 is turned, the eccentricity to which shaft 31 has been set in its relation to the axis of rotated table 29a will tend to cause mounting platen 27 to describe a circular movement, or orbit. However, the needed circular orbiting of platen 27 must occur without any accompanying rotation, for purposes of the intended lobe contouring. Such orbiting, without attendant rotation, is guided by an X—Y suspension which enables platen 27 to slide laterally in each of two mutually-perpendicular directions, as needed to accommodate the circular orbiting motion imparted by the crankshaft 31. That X—Y suspension includes two spaced parallel cylindrical slide shafts, 32, 33 (FIGS. 4 and 7), affixed to sides of intermediate plate 26, and two further spaced parallel cylindrical slide shafts, 34, 35, affixed to opposite sides of that same plate 26. Free ends of those slide shafts are mated with suitably-aligned low-friction bushings held by support blocks. Bushings 32a, 32b, 33a and 33b, are fixed to the underside of mounting platen 27 by way of support blocks such as 32c, and 32d, for example, so that the platen may slide on shafts 32 and 33 in directions shown at 36. In turn, bushings 34a, 34b, 35a and 35b are fixed atop baseplate 25 by way of support blocks 34c, 34d, 35c and 35d, to allow the aforesaid combination of the mounting platen 27 and its sliding support upon intermediate plate 26 to slide, in turn, in directions shown at 37, normal to directions 36 (FIG. 7).

Figure 5:
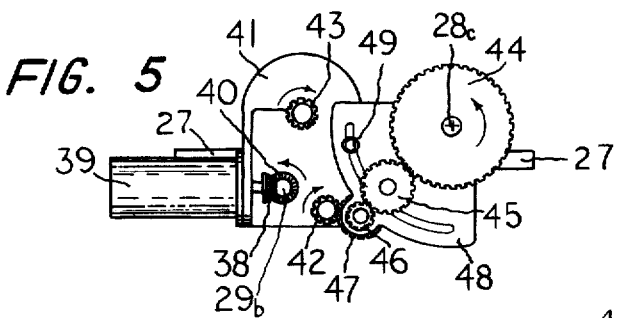
FIG. 5 supplies a front view of an electric motor and synchronizing gear drive for the fixture of FIG. 4.
Figure 6:
FIG. 6 illustrates the drive of FIG. 5 in an alternate position and with a different gear substituted for control of the number of cam lobes to be produced.
Figure 6:
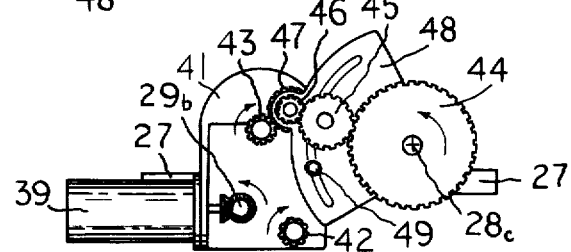

Such rotary motion as does occur atop mounting platen 27 is that which is prescribed by upper rotary table 28a as it is driven by its input shaft 28b, and that motion occurs relatively rapidly and in precise synchronism with the orbiting motion prescribed by lower rotary table 29a as it turns crankshaft 31 in response to drive by its input shaft 29b. Moreover, as has already been said, the upper table is rotated in a direction, such as that of arrow 18', which is opposite to the angular direction which the mounting platen 27 is orbited. These synchronized angular motions are preferably derived from a common source, which in the case of fixture 22 is the angular motive output from a bevel gear 38 driven by the shaft of an electric motor 39 supported by and movable with mounting platen 27 (FIGS. 5, 6 and 7). That bevel engages another, 40, which turns input shaft 29b of the lower rotary table at a relatively high speed. Within gear box housing 41, the high-speed rotation of shaft 29b is geared down to two related lower speeds of two spaced externally-disposed like pinion gears 42 and 43, the rotational speed of one conveniently being made twice that of the other, and both being in the same angular direction. Either of pinions 42 and 43 may be selected to drive the input shaft 28b of upper rotary table 28 by way of its attached spur gear 44, and, in each instance, such drive is achieved through a train of gears 45, 46 and 47 mounted on a pivot arm 48 which may be pivoted about the axis 28c of spur gear 44 and shaft 28b. Pivot arm 48 may be locked in either of two position, via a fastener 49 (FIGS. 5 and 6); in one such position, represented in FIGS. 5 and 7, gear 47 meshes with pinion 42 to drive the rotary table 28 at one predetermined speed, and, in the other position, illustrated in FIG. 6, the same gear 47 instead meshes with pinion 43 to drive the rotary table 28 at a second predetermined speed, in the same direction. Advantageously, one of the gears in the train between the shafts of pinions 42 and 43 and input shaft 28b of rotary table 28 is made interchangeable with other gears, as a means for conveniently determining and setting the number of cam lobes to be cut. As shown, gear 47 is disposed to serve that function; it is releasably keyed to the same shaft as gear 46, and is at an accessible site for substitution of another gear with a different number of teeth, and may be pivoted into appropriate engagement with either pinion 42 or 43 by simple fastening of pivot arm 48 at angular positions wherein different diameters of gear 47 are allowed for and wherein minimum backlash or looseness can occur.

Figure 7:
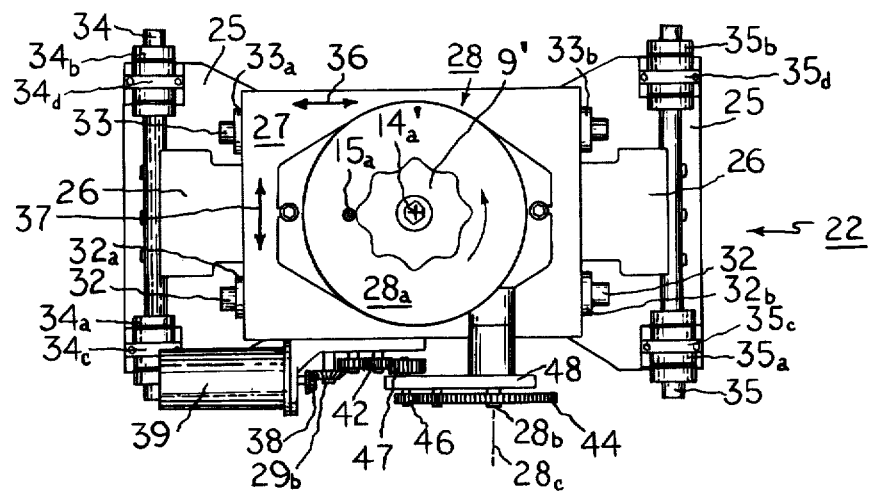
FIG. 7 is a top view of the arrangement of FIG. 4.

In operation, a cam blank 9' is fastened atop upper rotary table 28 with its intended center coincident with the axis of rotation 14a' of that table, and an appropriate gear 47 is put into place, with its number of teeth being selected to dictate that table 28 will rotate one full turn each time the lower rotary table 29 is rotated oppositely a full number of turns equal to the full number of lobes desired on the finished gerotor-contoured cam (i.e., once for each eight orbits, in the case of the eight-lobed cam 9' illustrated in FIG. 7). In addition, the eccentricity of the axis 31a of crankshaft 31 in relation to the vertical axis of rotation of lower table 29 is set at a desired value, equal to one-half the depth of lobes to be produced (i.e., the diameter of the resulting circular orbiting being equal to the intended depth of the lobes). Under common powering from electric motor 39, the cam blank is then caused to orbit relatively rapidly in one angular direction while being rotated slowly in the opposite direction, the X—Y suspension allowing the orbiting movements while preventing all rotation other than that controlled by the upper rotary table. Milling cutter 15a is rotated via its spindle 24, in a direction which allows it to bite into advancing material of the cam blank. Spindle 24 is conventionally movable to bring the edges of cutter 15a to precisely the intended distance from the central axis 14a' of upper table 28 which will yield a lobed cam of the desired maximum diameter.

More than a single cam blank may be contoured at one time, as by stacking them for the cutting. Also, one cam blank may have two different sets of lobes contoured upon it, with a first contouring being performed to about half its depth and the second contouring being performed upon the remainder after the blank has been turned over. It is not necessary that full-depth contouring of the lobes be achieved at once, and, instead it may be preferred to remove relatively small amounts of material during successive full rotations of the cam blank until the full contouring is realized. Backlash problems are avoided if the operations are continued without reversals.

The supporting machine may be of a construction and orientation other than that of the vertical milling machine illustrated, and the fixture may then be oriented appropriately for that setting. Other such machines include a horizontal miller, jig bore, cylindrical or surface grinder, equipped with contoured or formed tools. The tool diameter in the case of a vertical miller is the same as that of rollers to be used with the cam, and the grinding wheel of a jig bore would have that tool diameter also, whereas the rotary milling cutter of a horizontal miller or the grinding wheel of a cylindrical or surface grinder would be ground to a radius equal to the radius of the rollers to be used. Eccentricity settings for the orbiting may be carefully controlled by use of a known type of micrometer-feed boring head utilized for the purpose of holding the shaft 31 in eccentric relation to the axis of rotation of the bottom rotary table. The X—Y suspension may of course assume forms other than that illustrated, and drives and associated gearing may likewise be expressed in different ways with comparable results. Accordingly, it should be understood that the specific practices and preferred embodiments herein referred to have been offered by way of disclosure rather than limitation, and that various modifications, additions and substitutions may be effected by those skilled in the art without departure from these teachings; it is therefore aimed in the appended claims to embrace all such variations as fall within the true spirit and scope of this invention.

What we claim as new and desire to secure by Letters Patent of the U.S. is:

1. Apparatus for contouring peripheral lobes of a cam-type gear or the like comprising a material-removal tool, means for supporting a cam blank, means for moving said tool in material-removal relation to a periphery of the cam blank, means for rotating said supporting means and the cam blank supported thereon in one angular direction about a first axis at a first rate of angular rotation, and means for orbiting said axis and said supporting means and the cam blank thereon along a circular path lying in a plane normal to said axis and at a second rate of angular rotation which is an integral multiple of said first rate and synchronously therewith, said means for orbiting including a mount carrying said supporting means and said means for rotating said supporting means, a relatively stationary base, and a suspension for said mount in relation to said base allowing lateral movements of said mount in mutually-perpendicular directions normal to said axis and preventing rotation of said mount, said orbiting means orbiting said mount in relation to said base as guided by said suspension, whereby said tool removes material from the cam blank to leave the periphery thereof with an integral number of gerotor-contour lobes equal in number to said integral multiple.

2. Apparatus for contouring peripheral lobes of a cam-type gear or the like as set forth in claim 1 including means for adjusting the diameter of said circular path and thereby to set the depth of the lobes formed on the cam blank, means for changing said second rate of rotation in relation to said first rate to change the number of lobes which are contoured on the cam blank, and a source of rotational power fixed in relation to said mount and synchronously driving both said means orbiting said mount and said means for rotating said supporting means.

3. Apparatus for contouring peripheral lobes of a cam-type gear or the like as set forth in claim 1 wherein said removal tool has a cutting radius the same as the radius of circular-curvature cam surfaces which are to cooperate with the finished cam-type gear in a speed-changing transmission.

4. Apparatus for contouring peripheral lobes of a cam-type gear or the like as set forth in claim 1 wherein said supporting means comprises a first rotary table, wherein said means for orbiting comprises a second rotary table carried by said mount and a crankshaft journalled in said base and rotated by said second table in eccentric relation to the axis of rotation thereof, and further comprising a source of rotational motive power fixed in relation to said mount and driving said first and second rotary tables to rotate them simultaneously and synchronously at said first and second rates, respectively.

5. Apparatus for contouring peripheral lobes of a cam-type gear or the like as set forth in claim 4 wherein said suspension for said mount includes first and second mutually-perpendicular sets of linear slides and cooperating slide bushings, one of said sets of slides and bushings supporting said mount for said lateral movements in one of said mutually-perpendicular directions, and the other of said sets of slides and bushings supporting the said one of said sets on said base for said lateral movements in the other of said mutually-perpendicular directions.

6. Apparatus for contouring peripheral lobes of a cam-type gear or the like as set forth in claim 4 wherein said source comprises an electric motor, and wherein said electric motor drives said rotary tables through gearing, said gearing including a speed-reducing assembly of gears for rotating said first rotary table at a slower rate than said second rotary table, said assembly including means for selectably introducing gears with different numbers of teeth to change the relationships between said first and second rates of rotation and, thereby, to change the numbers of lobes being contoured.

7. Apparatus for contouring peripheral lobes of a cam-type gear or the like as set forth in claim 6 wherein said material-removal tool is the cutter of a vertical milling machine and is rotated about a vertical axis and has an effective cutting diameter substantially the same as the diameter of rollers which are to cooperate with the finished cam, and wherein said first axis and the axis of rotation of said second rotary table are vertical, and wherein said first rotary table is carried atop said mount and said second rotary table is dependent from said mount.

8. The method of contouring peripheral lobes of a cam-type gear or the like which comprises supporting a cam blank on a movable mount, providing a source of rotational motive power in fixed relation to and movable with the movable mount, using motive power from the source to rotate the cam blank on the mount in one angular direction about a first axis normal thereto at a first angular rate while restraining rotation of the mount in relation to a base by restricting the movements of the mount to two mutually-perpendicular paths normal to the first axis, using motive power from the same source movable with the mount to develop forces relative to the base which orbit the first axis and the cam blank and the mount along a circular path lying in a plane normal to the first axis, as allowed by movements of the mount along said mutually-perpendicular paths, and at a second angular rate which is an integral multiple of the said first rate and synchronous therewith, said circular path of the orbiting having a diameter which is small in relation to the diameter of the cam blank and which is equal to the depth of lobes being contoured, and removing material from a periphery of the cam blank at a fixed position in relation to which the cam blank is simultaneously orbited and rotated in the opposite directions, the removing of material being performed along a path having a curvature of substantially the same radius as that of circular-curvature cam surfaces which are to mesh with the lobes of the cam-type gear.

* * * * *